(12) United States Patent
Marx et al.

(10) Patent No.: US 6,479,987 B1
(45) Date of Patent: Nov. 12, 2002

(54) ANGLE ENCODER WITH FOUR HALL SENSORS AND METHOD FOR ANGLE DETERMINATION OF OUTPUT SIGNALS OF THE FOUR HALL SENSORS

(75) Inventors: Klaus Marx; Franz Jost, both of Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,879

(22) PCT Filed: Mar. 11, 1999

(86) PCT No.: PCT/DE99/00663

§ 371 (c)(1),
(2), (4) Date: Dec. 14, 1999

(87) PCT Pub. No.: WO99/54684

PCT Pub. Date: Oct. 28, 1999

(30) Foreign Application Priority Data

Apr. 18, 1998 (DE) .......................................... 198 17 356

(51) Int. Cl.⁷ .......................... G01B 7/30; G01R 33/06; G01R 33/025
(52) U.S. Cl. ............................. 324/207.2; 324/207.25; 324/207.12
(58) Field of Search .......................... 324/207.2, 207.25, 324/251, 207.12; 338/32 H

(56) References Cited

U.S. PATENT DOCUMENTS

| | | | |
|---|---|---|---|
| 3,162,804 A | * 12/1964 | Parsons | 324/368 |
| 4,415,856 A | * 11/1983 | Welles | 324/208 |
| 4,668,914 A | * 5/1987 | Kersten et al. | 324/251 |
| 5,220,282 A | * 6/1993 | Zimmerman | 324/207.12 |
| 5,612,906 A | * 3/1997 | Gotz | 364/571.01 |

FOREIGN PATENT DOCUMENTS

| | | | |
|---|---|---|---|
| DE | 1548591 | * | 3/1970 |
| DE | 196 406 95 | | 9/1996 |

* cited by examiner

Primary Examiner—Edward Lefkowitz
Assistant Examiner—Reena Aurora
(74) Attorney, Agent, or Firm—Michael J. Striker

(57) ABSTRACT

An angle encoder for determination of an angle between a sensor device (4, 5, 6, 7) and a magnetic field, having a magnet (2) that generates the magnetic field, a number of Hall elements (4, 5, 6, 7) disposed in the magnetic field, and flux-conducting parts (3) made of ferromagnetic material disposed between the Hall elements and rotationally fixed in relation to them, wherein the magnet (2) is embodied so that it can rotate in relation to the Hall elements and the flux-conducting parts, wherein at least four Hall elements (4, 5, 6, 7) are provided.

4 Claims, 4 Drawing Sheets

ANGLE ENCODER WITH FOUR HALL SENSORS AND METHOD FOR ANGLE DETERMINATION OF OUTPUT SIGNALS OF THE FOUR HALL SENSORS

BACKGROUND OF THE INVENTION

The current invention relates to an angle encoder and a method for angle determination.

It is known to use detectors or transmitters for detecting state changes, e.g. for angle determination of a rotatably supported component. In this connection, the use of slide- or layer potentiometers is widely known. With a slide potentiometer, for example, the relationship between the length of a wire resistor or layer resister and its resistance value is utilized in this connection. The wear and tear caused by the slide contact and the maintenance cost connected with this turn out to be disadvantageous in this connection. For the sake of freedom from maintenance, it is therefore desirable to use contactless angle encoders.

Due to strained environmental conditions, preferably magnetic sensors are used in the automotive field, in particular Hall sensors, anisotropic magnetoresistive sensors (AMR) or so-called giant magnetoresistive sensors (GMR). Embodiments with AMR sensors are known for angle measurements up to 180°. For angle measurements up to 360°, it is normal to use crossed Hall sensors. Finally, embodiments with Hall sensors are known in which a linear relationship between an angle (<180°) and an output signal can be achieved by means of suitable flux guidance of the magnetic field. For all Hall variants, offset-free and temperature-stable Hall elements are required, which exist in a variety of forms. These elements usually have an adjustable zero point and an adjustable sensitivity.

In all known methods that use Hall elements for angle measurement, tolerances, play, and temperature influences represent serious difficulties in actual use since distance changes between a magnet and a sensor or (for example temperature-induced) sensitivity changes of the sensor cause signal changes which then lead to a measurement error. Thus for example, the crossed Hall elements are in fact suitable for a 360° measurement, but are simultaneously very sensitive to position changes of the axle which is why very precise bearings are required in this connection. This result in higher costs. With conventional angle encoders, methods are known (for example resolver circuit, Philips AMR evaluation circuit, sigma-delta method) in which the temperature-dependent amplitude is eliminated. Tolerances or play in the axial bearing, however, cannot be compensated for by means of this method.

Previously known embodiments which are relatively insensitive to axial offsets have the disadvantage that they can only be used for angle measurements up to 180° and furthermore, are temperature-dependent in field sensitivity. With regard to AMR sensors, it must be noted that these are likewise very temperature-dependent and therefore when sensors of this kind are used, expensive compensation processes must be carried out.

DE-P 196 40 695 has disclosed a contactless magnetoresistive sensor which functions with two AMR sensor elements that are rotated in relation to one another by 45°. To build a magnetoresistive angle sensor with a temperature-stable zero point, the progression of the output signal of the sensor is determined over a presettable angle range with at least two different temperatures of the sensor, whereupon the output signal progressions are set in relation to one another in order to determine a reference angle at which the output signals deviate only slightly from one another as a result of a slight temperature dependency, and a reference angle found in this way is selected as the zero point in subsequent measurements. This relatively expensive method exemplifies the efforts that are usually required in the compensation for tolerances and temperature changes in sensors of this kind.

SUMMARY OF THE INVENTION

The object of the current invention is to produce an angle encoder which is not sensitive to axial offsets or tolerances and at the same time permits a measurement of angles of up to 360°, as well as a corresponding method for angle determination.

With the angle encoder according to the invention, it is possible to easily compensate for axial offsets or component tolerances, wherein it is possible to measure angles of up to 360°. Manufacture-induced or temperature-induced effects, e.g. tolerances and play, can be compensated for in a simple manner.

According to at preferred embodiment, the magnet of the angle encoder is embodied as cylindrical, wherein the flux-conducting parts encompassing the magnet are embodied as essentially quadrant-shaped. Since the flux-conducting parts and therefore the Hall elements disposed between them can rotate in relation to the magnet, this assures that the distances between the individual flux-conducting parts or Hall elements and the magnet do not change during a rotation. This permits a particularly simple evaluation of the measurement signals.

The Hall elements are suitably disposed respectively offset from one another by 90°. As a result, in respectively opposed Hall elements, corresponding sine or cosine signals are obtained, which can easily be evaluated in order to obtain an angle value that is independent of tolerances and temperature.

The magnet suitably has a diametrical magnetization. As a result of this, the magnetic field induced in respectively opposed Hall elements has essentially the same magnitude.

In order to further attain the object according to the invention, a method is proposed for angle determination of an angle between a sensor device and a magnetic field through the use of an angle encoder according to the invention. Deviations of the signals picked up by the Hall elements from the pure sine or cosine form, which result from tolerances or plays in the angle encoder, can be easily compensate for by means of the method proposed. Errors that occur can be almost completely corrected by means of the method proposed.

According to a preferred embodiment of the method, a sum signal is respectively formed from at least two Hall voltages proportional to the sine of the angle to be determined and from at least two Hall voltages proportional to the cosine of the angle to be determined, and the sum signals thus obtained are supplied to a sine-cosine evaluation circuit for arithmetical determination of the angle to be determined. This method considerably reduces the occurrence of angular errors in comparison to conventional methods. In relation to a single evaluation, i.e. the determination of the angle by means of only one sine signal and one cosine signal, a reduction of the angular error by a factor of 20 was attained with the use of the angle encoder according to the invention.

According to another preferred method, for at least two pairs of Hall elements, the one of which has a Hall voltage proportional to the sine of the angle to be determined and the other of which has a Hall voltage proportional to the cosine of the angle to be determined, the angle to be determined is arithmetically determined by means of a sine-cosine evaluation circuit. As a result, the angle encoder according to the invention can easily be used as a redundant 360° sensor.

In a suitable fashion, the average is calculated from the at least two values determined for the angle to be determined. This in turn permits a very precise determination of the angle to be determined.

In a suitable fashion, the arithmetical determination of the angle to be determined is carried out based on the signals that are respectively proportional to the sine or cosine of the angle, by means of a determination of the associated arc tangent. A calculation of this kind by means of the arc tangent is suited for an arithmetical determination of the angle to be determined based on the above-mentioned sum signals as well as for the arithmetical determination based on a respective sine value and cosine value.

Preferred embodiments of the invention will now be explained in detail in conjunction with the accompanying drawings.

DESCRIPTION OF THE PREFERRED EMBODIMENTS

Figure 1:
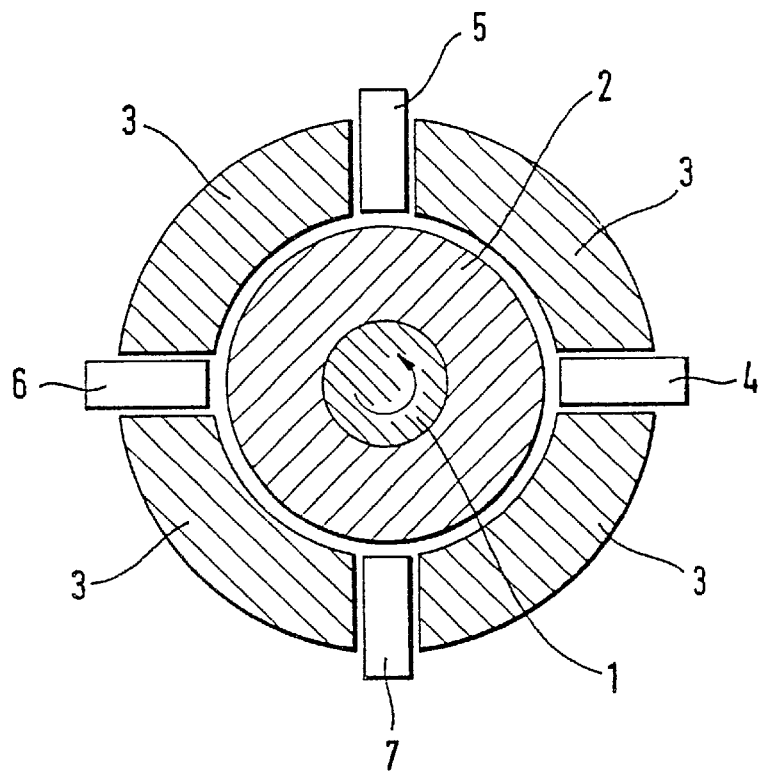
FIG. 1 is a schematic top view of an angle encoder according to the invention.
Figure 2:
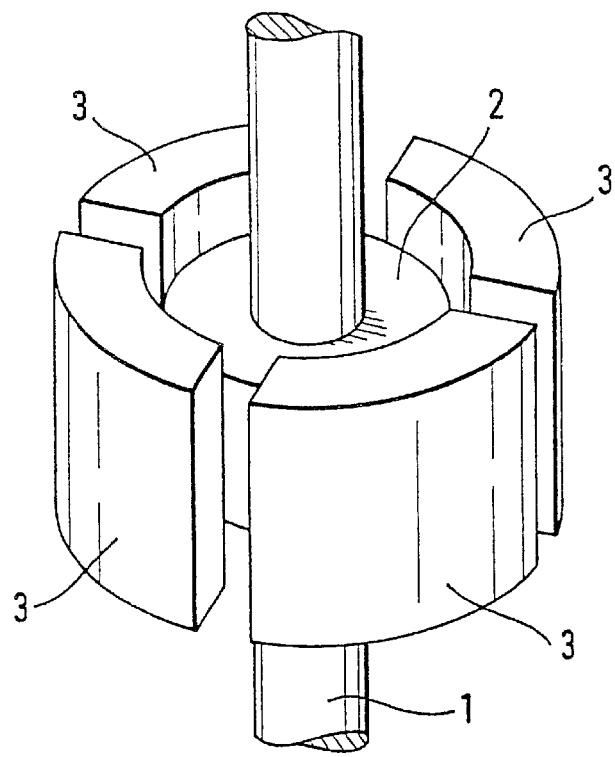
FIG. 2 is a schematic, perspective view of the angle encoder from FIG. 1, wherein the Hall elements are not included in the drawing for the sake of clarity.
Figure 3:
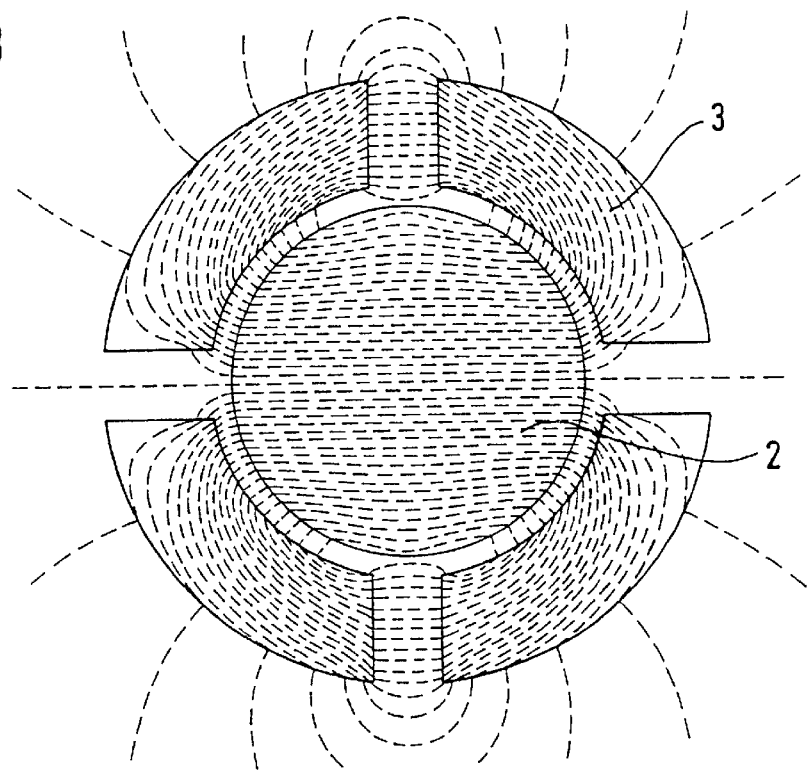
FIG. 3 shows the field distribution when the magnet of the angle encoder according to the invention has a horizontal magnetization direction.
Figure 4:
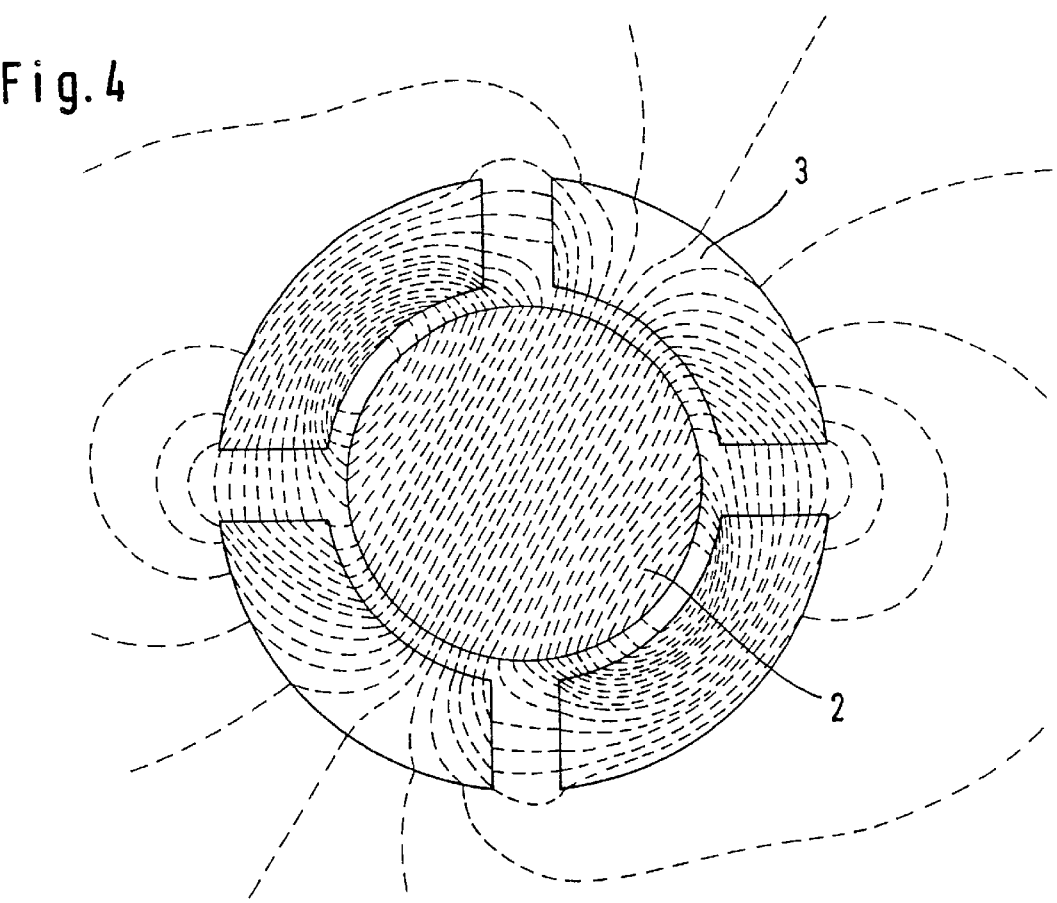
FIG. 4 shows the field distribution when the magnet is rotated by 60° in relation to the horizontal.
Figure 5:
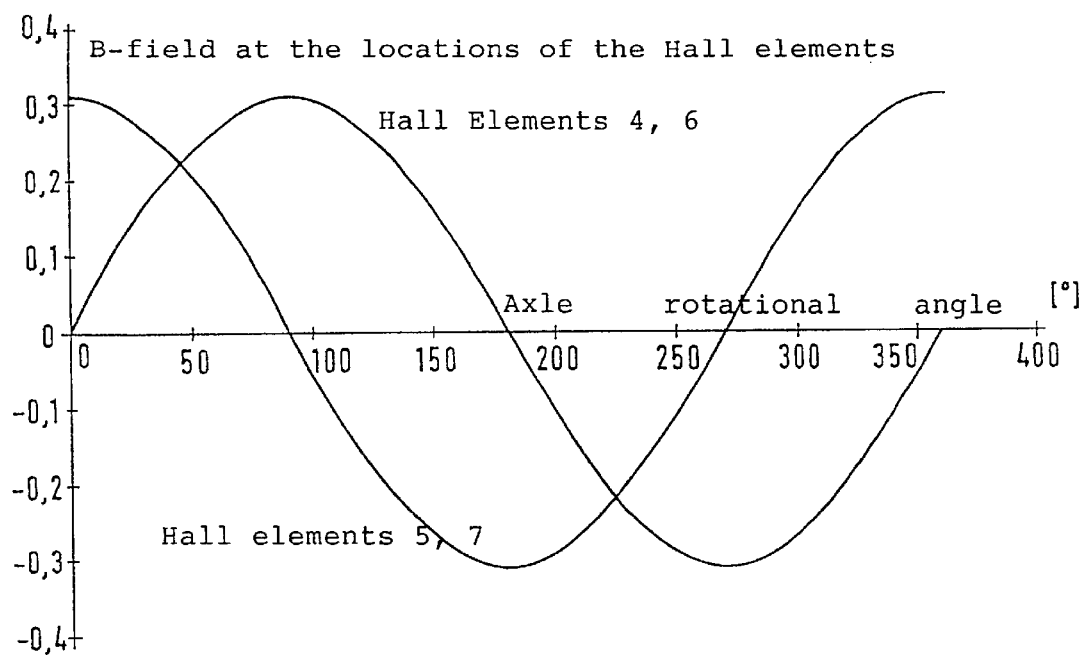
FIG. 5 shows the magnetic field progression (azimuth component) at the locations of the Hall elements as a function of a rotation of the magnet in relation to the Hall elements.

The design of the angle encoder according to the invention will be described first in relation to FIGS. 1 and 2. On a rotatably supported axle 1, a cylindrical magnet 2 is provided, which is affixed to this axle and has a diametrical magnetization (also see FIGS. 3, 4). Four stationary, quadrant-shaped flux-conducting parts 3 made of ferromagnetic material are disposed around the magnet, separated by an air gap. In slots formed between the flux-conducting parts 3, there are four offset-free and temperature-stable Hall elements 4, 5, 6, 7, which are sensitive to the magnetic field directed in the azimuth direction. The field distribution in the locations of the Hall sensors is shown in FIGS. 3 and 4 for different rotation directions of the magnet 2 in relation to the flux-conducting parts 3. Here too, as in FIG. 2, the Hall elements 4, 5, 6, 7 are not included in the drawing for the sake of clarity. Depending on the zero angle of the magnetization of the magnet 2, the Hall signal voltages induced in the Hall elements 4, 6 are proportional to the sine of the azimuth field intensity produced by the magnet 2, whereas in this instance, the Hall signal voltages induced in the Hall elements 5 and 7 are proportional to the cosine of this field intensity and thereby to the rotational angle of the axle 1. The azimuth field components which induce the respective Hall signal voltages in the Hall sensors and are disposed in the slots between the flux-conducting parts 3 are plotted in FIG. 5 in relation to the respective rotational angle of the axle 1. Two methods are proposed according to the invention in order to eliminate errors that occur in an angle determination of this kind, for example a temperature-dependent amplitude, or tolerances or play in the axial bearing, which lead to a deviation from the pure sine or cosine form of the signals.

Figure 6:
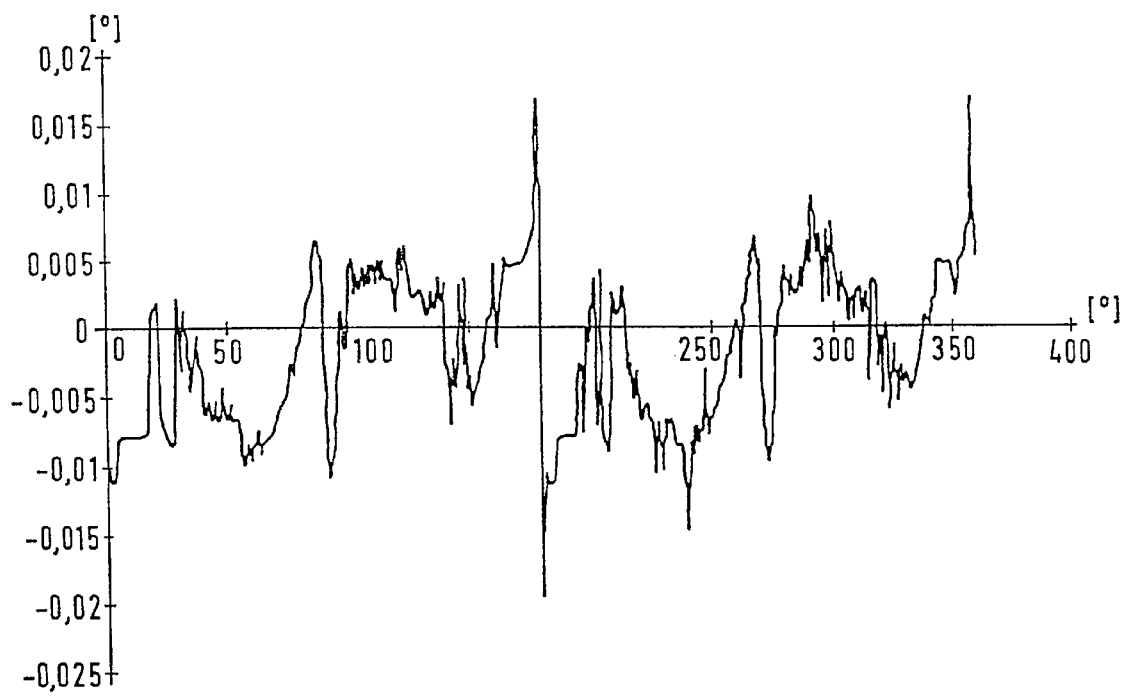
FIG. 6 shows the angular errors occurring with the use of a first preferred method in the determination of the angle between the sensor device and the magnetic field as a function of the rotational angle (respectively recorded in °)

In the first method, the Hall voltages induced in the opposing Hall elements are first added by means of an adder (not shown). Since the magnetic field at the locations of the Hall elements 4, 6 is proportional to the sine of the rotational angle of the axle 1 or of the magnet 2 in relation to the sensor device, a sum signal of the two sine values is obtained. Adding the Hall voltages of the elements 5, 7 correspondingly yields a sum signal of the two cosine values. These two sum signals are supplied as input signals to a sine-cosine evaluation circuit (not shown). The sine-cosine evaluation circuit then calculates the associated angle based on these input signals. This calculation can be carried out, for example, by means of an arc tangent calculation. The errors this produces in relation to the actual angle are shown in FIG. 6. By forming the respective sum signals on the basis of respectively opposing Hall elements 4, 6 or 5, 7, for example a play in the axial bearing of the axle 1 can be effectively compensated for. The angular error that occurs with the use of this method is depicted in FIG. 6 as a function of the rotational angle. With an offset of the rotational axis by 0.2 mm, the angular error shown in FIG. 6 increases, for example, from maximally 0.02° to 0.1°. These values represent a considerable improvement in relation to conventional angle encoders. In the exemplary instance of the rotational axis being offset by 0.2 mm, when this method is used, the angular error is reduced by a factor of 20 in relation to a single evaluation.

The second method according to the invention will now be explained in detail in conjunction with FIG. 7. In this connection, by means of the sine signal of the Hall element 4 and the cosine signal of the Hall element 5 and by means of the sine signal of the Hall element 6 and the cosine signal of Hall element 7, the corresponding angle values of the rotational angle of the axle 1 are respectively calculated. The calculation of these respective angle values can in turn be carried out by means of the above-described arc tangent calculation.

Figure 7:
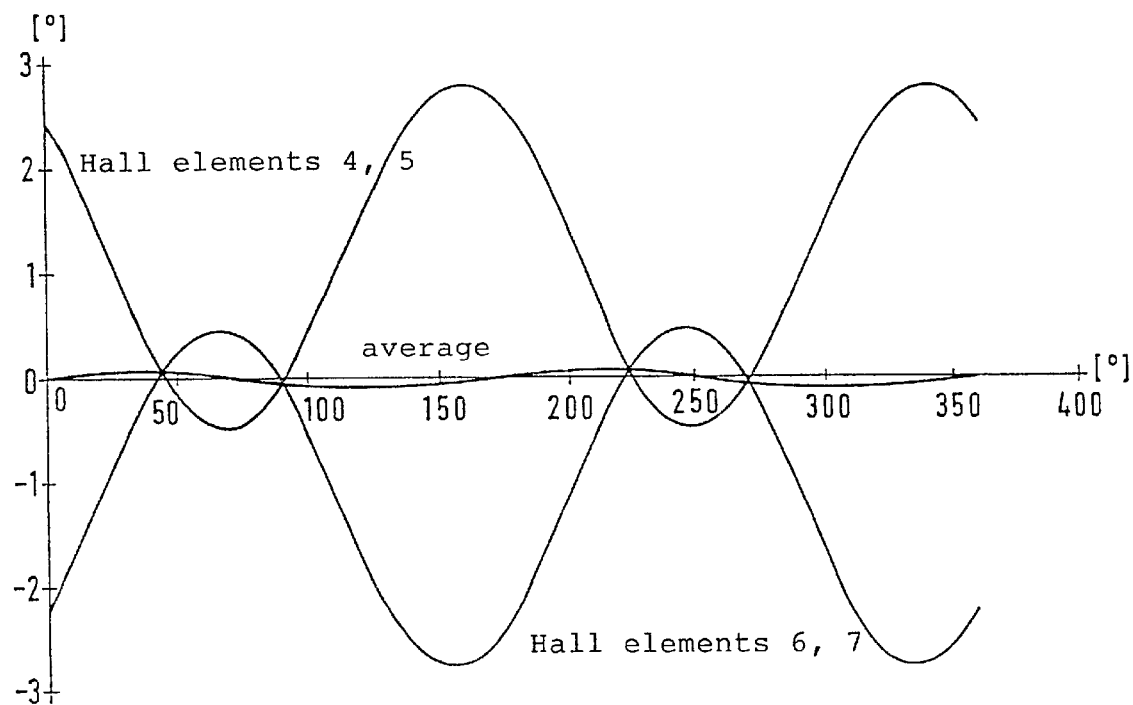
FIG. 7 shows the angular errors occurring with the use of the second preferred method according to the invention, as a function of the rotational angle, with an axial offset of 0.2 mm.

It is clear from FIG. 7 that for example at 0.2 mm of axial offset, relatively large deviations occur between the measured angles and the actual angle.

However, it follows from FIG. 7 that the angle occurring for the respective pairs of Hall elements 4, 5 and 6, 7, is essentially the same, comparatively speaking, over the entire angular range of 360°, but is differently signed. Through the formation of the average value from the two angular values measured, it is therefore easily possible to obtain a very precise measurement value for the actual angle. It is clear from FIG. 7 that the actual angular error is less than 0.1 when this method is used. In order to further refine the method, it is also possible, for example, to determine additional angles by means of the Hall sensor pairs 4, 7 and 5, 6. In this case, an average of four measured angle values can be calculated.

The individual angles measured in the example shown in FIG. 7 can also be used for a redundant monitoring so that a sensor failure can be reliably detected. The device with four Hall elements is therefore particularly suited for uses in which redundancy is necessary for safety reasons. There are advantageous applications of the current invention in the automotive field, for example, in which precise 360° angle measurements are required (for example cam shaft, crankshaft), or in which redundancy is required for safety reasons (for example pedal transducers, brakes, electronic throttle control).

What is claimed is:

1. A method for angle determination of an angle between a sensor device and a magnetic field through the use of an angle encoder having a magnet (2) that generates the magnetic field, a number of Hall elements (4, 5, 6, 7) disposed in the magneticfield, and flux-conducting parts (3) made of ferromagnetic material disposed between the Hall elements and rotationally fixed in relation to the latter, wherein the magnet (2) is embodied so that it can rotate in relation to the Hall elements and the flux-conducting parts, wherein at least four Hall elements (4, 5, 6, 7) are provided and wherein the magnet (2) has a diametrical magnetization, the method comprising the steps:

alignment of the magnet (2) in such a way that a Hall voltage respectively induced in at least two Hall elements (4, 6) is proportional to the sine of the angle between a reference direction and a field direction produced by the magnet and that a Hall voltage respectively induced in at least two Hall elements (5, 7) is proportional to the cosine of the angle between the reference direction and the field direction produced by the magnet, measurement of the Hall voltages in the respective Hall elements (4, 6, 5, 7)

arithmetical determination of the angle to be determined through the use of the four Hall voltages measured, whereby a sum signal is respectively formed from said at least two Hall voltages in Hall elements (4, 6), which voltages are proportional to the sine of the angle to be determined, and from said at least two Hall voltages in Hall elements (5, 7) which voltages are proportional to the cosine of the angle to be determined, and whereby the sum signals thus obtained are supplied to a sine-cosine evaluation circuit for arithmetical determination of the angle to be determined.

2. The method according to claim 1, characterized in that the arithmetical determination of the angle to be determined is carried out based on the signals that are respectively proportional to the sine or cosine of the angle, by means of a determination of an associated arc tangent.

3. A method for angle determination of an angle between a sensor device and a magnetic field through the use of an angle encoder having a magnet (2) that generates the magnetic field, a number of Hall elements (4, 5, 6, 7) disposed in the magnetic field, and flux-conducting parts (3) made of ferromagnetic material disposed between the Hall elements and rotationally fixed in relation to the latter, wherein the magnet (2) is embodied so that it can rotate in relation to the Hall elements and the flux-conducting parts, wherein at least four Hall elements (4, 5 ,6, 7) are provided and wherein the magnet (2) has a diametrical magnetization, the method comprising the steps:

alignment of the magnet (2) in such a way that a Hall voltage respectively induced in at least two Hall elements (4, 6) is proportional to the sine value of the angle between a reference direction and a field direction produced by the magnet and that a Hall voltage respectively induced in at least two Hall elements (5, 7) is proportional to the cosine value of the angle between the reference direction and the field direction produced by the magnet, measurement of the Hall voltages in the respective Hall elements (4, 6, 5, 7), arithmetical determination of the angle to be determined through the use of the four Hall voltages measured, whereby for at least two pairs of Hall elements (4, 5, 6, 7), the one of which has a Hall voltage proportional to the sine of the angle to be determined and the other of which has a Hall voltage proportional to the cosine of the angle to be determined, the angle to be determined is arithmetically determined by means of a sine-cosine evaluation circuit, and whereby the average from the two values determined for the angle to be determined is calculated.

4. The method according to claim 3, characterized in that the arithmetical determination of the angle to be determined is carried out based on the signals that are respectively proportional to the sine or cosine of the angle, by means of a determination of an associated arc tangent.

* * * * *